United States Patent

Zollitsch et al.

[11] Patent Number: 5,888,554
[45] Date of Patent: Mar. 30, 1999

[54] APPARATUS FOR COOLING AND GRANULATING PLASTIC STRANDS

[75] Inventors: Ludwig Zollitsch, Korntal; Ulrich Kreuz, Erdmannhausen, both of Germany

[73] Assignee: C.F. Scheer & Cie GmbH & Co., Stuttgart, Germany

[21] Appl. No.: 727,515

[22] PCT Filed: Apr. 21, 1995

[86] PCT No.: PCT/EP95/01513

§ 371 Date: Dec. 12, 1996

§ 102(e) Date: Dec. 12, 1996

[87] PCT Pub. No.: WO95/29048

PCT Pub. Date: Nov. 2, 1995

[30] Foreign Application Priority Data

Apr. 27, 1994 [DE] Germany .................. 44 14 754.6

[51] Int. Cl.[6] .................................................. B29B 13/10
[52] U.S. Cl. ................. 425/71; 83/349; 83/360; 425/192 R; 425/294
[58] Field of Search ................... 425/196, 308, 425/311, 192 R, 66, 294, 377, 71; 83/349, 859, 860, 906

[56] References Cited

U.S. PATENT DOCUMENTS

| Re. 33,492 | 12/1990 | Hunke | 425/71 |
|---|---|---|---|
| 4,025,252 | 5/1977 | Hunke | 425/67 |
| 4,061,282 | 12/1977 | Walker et al. | 83/859 |
| 5,066,210 | 11/1991 | Hunke | 425/71 |
| 5,182,115 | 1/1993 | Nogossek et al. | 425/71 |
| 5,265,507 | 11/1993 | Noda et al. | 83/349 |
| 5,313,864 | 5/1994 | Forgash et al. | 83/349 |
| 5,474,435 | 12/1995 | Hunke | 425/71 |

FOREIGN PATENT DOCUMENTS 19 16 219  11/1970  Germany.

*Primary Examiner*—Patrick Ryan
*Assistant Examiner*—Iurie Schwartz
*Attorney, Agent, or Firm*—Andrus Sceales Starke & Sawall

[57] ABSTRACT

A device for cooling and granulating strands of plastic which emerge in molten form from dies (3) before being fed, either directly or via a chute (22) which can be positioned underneath the dies and has a cooling water supply, to a subsequent flow channel (1) which has at least one device for producing a stream of coolant. From the flow channel (1) the strands (4) are fed into a granulator (16) which is provided with at least one blade system comprising a rotating shearing blade (13) and a counterblade (12) and used for granulating the strands (4). The device is without a pair of feed rollers as an assembly belonging to the granulator (16) but has a pair of draw-off rollers (20, 21) at the end region of the flow channel (1). This draw-off roller system (20,21) is used to draw off the substantially solidified plastic strands (4) from the flow channel (1), thus ensuring that after leaving the draw-off roller system (20, 21), the strands (4) enter the directly adjacent intake area of the granulator (16), which is designed as a detachable assembly, and then undergo further processing. In the event that the cutting blades in the granulator (16) become unusable after a long period of use, the entire granulator (16) can be removed from the draw-off roller system (20,21) of the flow channel and replaced with a new one. The granulator can be replaced with virtually no interruption in the flow of plastic during operation of the system, which is of great advantage, especially in continuous production.

9 Claims, 2 Drawing Sheets

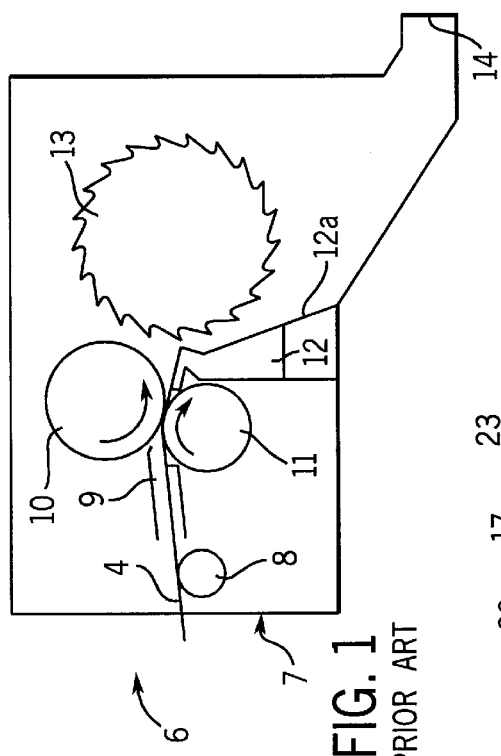
FIG. 1
PRIOR ART
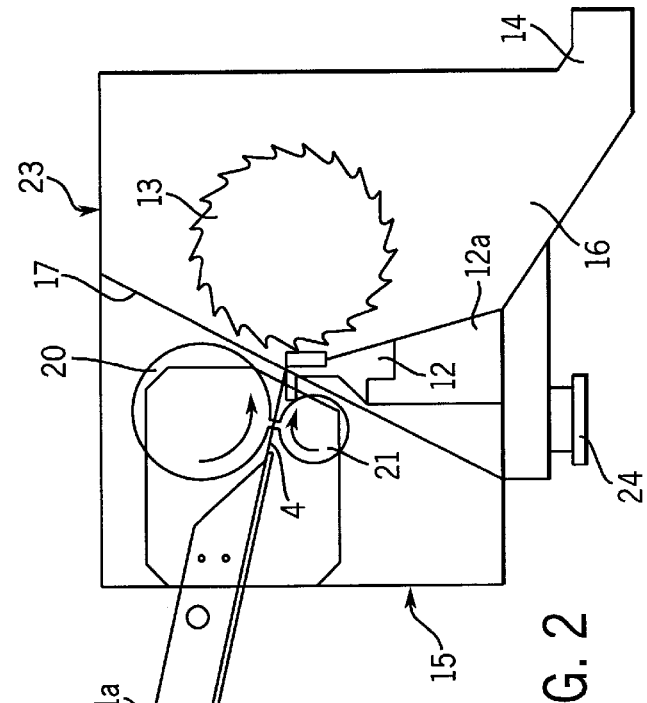
FIG. 2
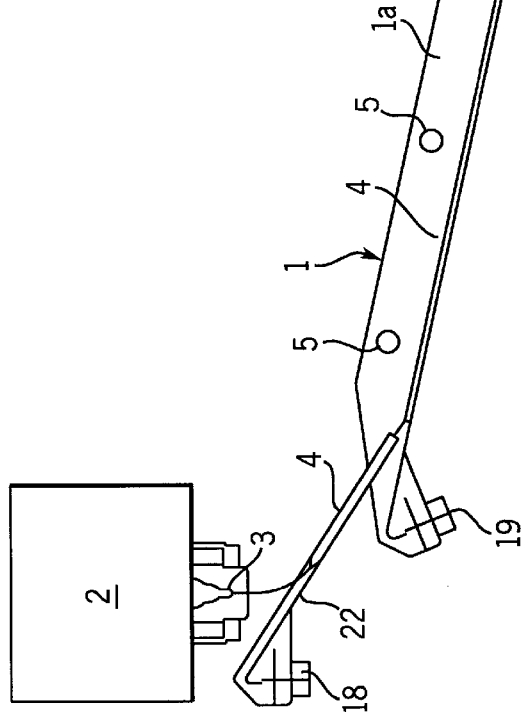

APPARATUS FOR COOLING AND GRANULATING PLASTIC STRANDS

BACKGROUND OF THE INVENTION

This invention relates to an apparatus for cooling and granulating plastic strands which emerge from nozzles in molten form and are fed, either directly or via a chute with a cooling water pipe to be disposed below the nozzles, to a following discharge channel having at least an apparatus for producing a coolant stream, the strands passing after the discharge channel into a granulator having at least a knife assembly consisting of a rotatable shearing knife and counterknife for granulating the strands.

DE 39 00 250 C2 discloses an apparatus for cooling, drying and granulating strands emerging from nozzles in molten form having a discharge channel disposed with the receiving-side end thereof under the nozzles, a device furthermore being provided for producing a coolant stream on the discharge channel, the discharge channel being followed by a granulator, and a drainage path in which the discharge channel is provided with openings for free passage of the coolant also being disposed in the discharge channel before the discharge-side end.

In this known apparatus the discharge channel is furthermore provided in the bottom thereof in the area after the drainage path with inlet nozzles for an air stream over such a length and so close together that the strands are guided along the discharge channel largely frictionlessly with respect to the bottom with a degree of dryness permitting immediate processing into the granulator disposed at the discharge-side end thereof. This granulator has within a suitable housing substantially two draw-in rolls one above the other for the plastic strands, and a cutter block cooperating with a corresponding counterknife. This cutter block and the counterknife serve to granulate the plastic strands fed by the draw-in rolls, and the granules consequently produced by the granulator fall out through a discharge shaft for further processing.

Depending on the application of such apparatuses it is sooner or later necessary to replace the wearing parts, in particular the cutting tools, which means that the apparatus must be shut down for the suitable maintenance and repair measures to be performed.

As mentioned above, this includes in particular replacing the components of the complete knife assembly, in particular the shearing knife and counterknife, but possibly also the entire granulator and in some cases also other subassemblies of the apparatus. Such operations for replacing the wearing parts of the granulator or the complete granulator are extremely time-intensive and cause relatively high costs, above all because at least one complete granulator per apparatus must be held in stock in many cases, in particular in cases where it is impossible to replace individual components of the granulator for reasons of time due to the type of application of the apparatus.

In this connection it must in particular also be considered that one main area of application for granulators of the abovementioned type is in continuous operation, whereby for reasons of process technology continuous plants cannot be switched off, i.e. in such cases the granulating process must run on practically without interruption.

There are also cases of application with discontinuous operation, but here too there must be practically no interruption during discharge, i.e. during the granulation time, since this would clearly worsen the quality of the resulting product.

The granulators of known apparatuses have the further disadvantage that if the draw-in rolls are blocked by the product the places to be cleaned are difficult to reach.

During operation of known apparatuses the plastic strands, after entering the granulator, are drawn by the pair of draw-in rolls disposed therein, whereby it must be considered that there is a relatively great distance between the nozzles from which the strands emerge in molten form and this pair of draw-in rolls of the granulator. The consequence is that initially molten plastic strands are drawn by soon hardened plastic strands in uncontrolled fashion over a relatively great distance. Depending on how the types of plastic are used, this might cause twisting or adherence of the plastic strands so that the resulting product, i.e. the granules, are irregular.

BRIEF SUMMARY OF THE INVENTION

In view of the drawbacks of known apparatuses as described above, the present invention is based providing an improved apparatus of the above-defined type which is constructed in such a way that the complete granulator can be replaced in relatively simple fashion and even with practically uninterrupted operation of the plant.

This problem is solved according to the invention in an apparatus of the above-defined type in that the discharge channel has in the end area thereof facing the granulator a draw-off roll assembly for drawing the strands off the discharge channel and feeding the strands to the granulator formed as a separate subassembly.

The basic idea of the invention is seen to lie in doing without a pair of draw-in rolls as a subassembly belonging to the granulator and in associating a pair of draw-off rolls with the end area of the discharge channel, this draw-off roll assembly serving to draw the substantially hardened strands off the discharge channel so that after the draw-off roll assembly the strands enter the directly adjacent inlet area of the granulator formed as a virtually separable subassembly and are then subjected to further processing there. If the cutting knives contained in this granulator, e.g. shearing knife and counterknife, have become blunt due to long use, the complete granulator can be removed from the draw-off roll assembly of the discharge channel and replaced by a fresh granulator. The granulator can also be detachably connected directly with the draw-off roll assembly of the discharge channel.

Such replacement operations can in particular be performed in an extremely short time.

According to an advantageous development of the invention, the discharge channel has a housing containing the draw-off roll assembly, a further housing containing the granulator being disposed adjacent said draw-off roll assembly housing in such a way as to be displaceable relative to said housing, so that the granulator can be removed from the discharge channel and replaced in especially simple fashion.

However the complete granulator can also be replaced by detaching the granulator with its blunted knife assemblies by operating suitable quick coupling means disposed between the two housings, displacing it relative to the draw-off roll assembly, and replacing it by a new granulator, then connecting the latter with the draw-off roll assembly housing again using the quick coupling means.

Consequently the granulator can be replaced practically without interrupting the strand flow during operation of the plant, which is extremely advantageous in particular in the case of continuous production.

A further advantage of the inventively designed apparatus is that the discharge channel serving as a cooling channel can be designed and produced virtually as one unit with the draw-off roll assembly associated with one end area thereof.

The discharge channel with the draw-off roll assembly, on the one hand, and the granulator, on the other hand, can be put together virtually in modular fashion.

Further advantageous embodiments of the invention can be found in the subclaims.

BRIEF DESCRIPTION OF THE SEVERAL VIEWS OF THE DRAWING

The invention will be explained more closely in the following with reference to embodiments, reference being made to the enclosed drawings in which:

FIG. 1 shows a schematic side view of a prior art granulator;

FIG. 2 shows schematically a side view of an inventive apparatus for cooling and granulating plastic strands in the operating phase thereof.

DETAILED DESCRIPTION OF THE INVENTION

Figure 3:
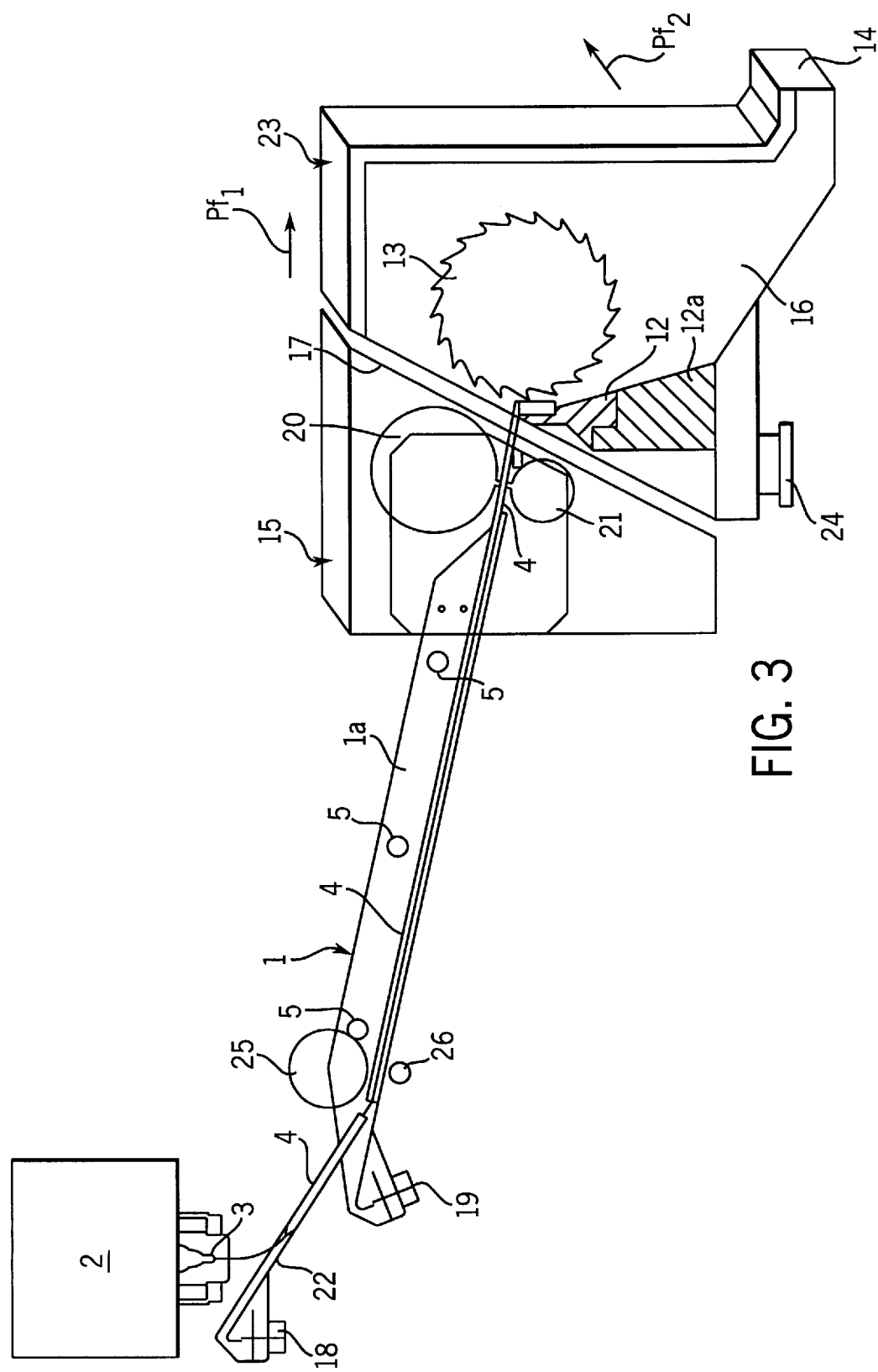
FIG. 3 shows a further side view of the apparatus of FIG. 2, now showing the granulator subassembly in a position separated from the draw-off roll assembly of the discharge channel.

FIG. 1 indicates the exemplary execution of granulator 6 as used in a prior art apparatus for cooling and granulating plastic strands. Granulator 6 is disposed after a discharge channel (not shown) and has substantially housing 7 with an inlet port into which plastic strand 4 coming from the discharge channel is introduced. In the interior of granulator housing 7 there is firstly guiding roll 8 for passing on plastic strand 4 toward draw-in shaft 9 which the plastic strand enters, then passing to the gap between upper draw-in roll 10 and lower draw-in roll 11. Draw-in rolls 10 and 11 draw strand 4 out of the discharge channel and guide it to rotating shearing knife 13 cooperating with anvil knife 12 disposed on knife holder 12a. This knife assembly serves to granulate supplied plastic strands 4, the resulting plastic granules leaving granulator 6 at outlet 14. As apparent from FIG. 1, known granulator 6 consists of a plurality of single components disposed within housing 7, the complete granulator being disposed after the discharge or cooling channel and possibly even forming a unit therewith.

When the cutting tools contained in the granulator, such as shearing knife and anvil knife, become blunt and thus useless in the course of time it is necessary to replace complete granulator 6, possibly even the complete cooling or discharge channel and the granulator connected therewith.

Such replacement operations are naturally very time-intensive and consequently extremely costly.

FIG. 2 indicates an apparatus for cooling and granulating plastic strands according to the present invention, this apparatus having substantially the following elements:

schematically shown nozzle set 2 to which thermoplastic material is fed in molten form in a manner not specified here but known in the art, then being pressed out of nozzle 3 disposed at the bottom. A plurality of such nozzles 3 are generally located side by side in a row below nozzle set 2.

FIG. 2 shows the operating situation of the apparatus. In this case the plastic strands emerging from nozzles 3 first pass onto slanted introducing chute 22 provided in the end area thereof facing away from discharge channel 1 with cooling water feed pipe 18. The water film thereby fed to introducing chute 22 carries along plastic strands 4 in such a way that they are passed on along chute 22 and beyond the end thereof pointing toward discharge channel 1 to discharge channel 1. Discharge channel 1 is likewise shown in slanted arrangement, being likewise provided at the upper end thereof with cooling water feed pipe 19. Discharge channel 1 passes on supplied plastic strands 4 toward the assembly shown on the right-hand side of FIG. 2, which will be described in detail below. In any case, plastic strands 4 sliding downward jointly in parallel arrangement are cooled with the help of the supplied cooling water in the area of discharge channel 1, discharge channel 1 also being combined with a number of cooling water spray nozzles 5 which additionally spray coolant onto strands 4. Such cooling water spray nozzles 5 are disposed for example in the area of lateral housing walls 1a of discharge channel 1. Discharge channel 1 now guides gradually hardening plastic strands 4 toward the end area thereof facing granulator 16. However, this end area of discharge channel 1 first has housing 15 containing a subassembly consisting of draw-off rolls, namely upper draw-off roll 20 and lower draw-off roll 21, between which a draw-off gap is formed for plastic strands 4 coming from discharge channel 1. Consequently, cooled plastic strands 4 are drawn jointly off discharge channel 1 and then reach following granulator 16. Granulator 16 borders with the inlet side thereof directly on housing 15 for draw-off roll assembly 20, 21. The granulator housing is designated as 23.

Granulator 16 consists substantially of shearing knife 13 and anvil knife 12 (counterknife) which is mounted on suitable knife holder 12a.

This inventive embodiment in particular involves granulator 16 being connected with housing 23 thereof to housing 15 of draw-off roll assembly 20, 21 in such a way that housing 23 is displaceable relative to housing 15 in one or more directions, for the purpose of connection with or detachment from housing 15 for draw-off roll assembly 20, 21. In particular, separating area 17 extending on a slant between housings 15 and 23 and forming virtually a common separating plane for housings 15 and 23 is provided so as to permit relatively easy separation or removal of granulator housing 23 from housing 15 for draw-off roll assembly 20, 21 when necessary. For detachably interconnecting housings 15 and 23 one provides for example quick coupling means disposed in the area between the two housings and not shown closely in the drawings. In any case the shown assembly makes it possible in relatively simple fashion to design granulator 16 in the form of a separable subassembly which can be replaced in a practically effortless manner relative to the other subassemblies of the apparatus according to FIG. 2 when necessary. The manner of representation in FIG. 2 shows the apparatus for cooling and granulating plastic strands in the operating phase thereof, the two housings 15 and 23 closely bordering on each other so that plastic strands 4 leaving the two draw-off rolls 20 and 21 pass directly into the inlet area of granulator 16 and are further processed there until the resulting granules finally emerge from outlet 14 of housing 23.

Granulator housing 23 also has cooling water discharging apparatus 24 in the lower area thereof.

FIG. 3 shows the apparatus of FIG. 2 in an operating phase in which housings 15 and 23 are separated from each other by first displacing housing 23 in the direction of arrow $PF_1$, i.e. parallel to the alignment of housing 15, and then displacing it in the direction of arrow $PF_2$, i.e. perpendicular to the direction according to $PF_1$.

This involves the replacement operation with respect to granulator 16, and after complete removal of useless granulator 16 a new granulator is attached in the reverse moving directions to housing 15 for draw-off roll assembly 20, 21 in accordance with separating area 17, which preferably extends on a slant between housings 15 and 23, as shown in FIGS. 2 and 3.

There is also the possibility, which is not specified in the drawings, of providing detachable fastening means between discharge channel 1 and housing 15 for draw-off roll assembly 20, 21.

FIG. 3 also indicates that discharge channel 1 can likewise be provided with pair of rolls 25, 26 in the initial area thereof which is associated with introducing chute 22 and into which plastic strands 4 yet to be cooled are introduced, plastic strands 4 being guided between these two rolls 25, 26. However, it is also possible to use only one roll 25 instead of a pair of rolls. Using one or more rolls 25, 26 in the upper area of discharge channel 1 one can further improve the quality of supplied plastic strands in certain cases, by applying tension to these strands through pairs of rolls 25, 26, doing so in relative proximity to nozzle 3 so as in particular to avoid strand twisting and to improve the further transport toward discharge channel 1 and further toward granulator 16.

It should also be mentioned that discharge channel 1 shown in FIGS. 2 and 3 in the inventive apparatus for cooling and granulating plastic strands can be directed virtually in uninterrupted execution up to the draw-off roll assembly with upper draw-off roll 20 and lower draw-off roll 21, whereby this draw-off roll assembly is disposed in the lower end area of discharge channel 1 facing granulator 16 and can be firmly connected therewith, i.e. practically forms a unit with discharge channel 1. If rolls 20, 21 are blocked, they are readily accessible and can therefore be cleaned easily.

Finally it should be pointed out that in the above-described embodiment of the apparatus for cooling and granulating plastic strands, introducing chute 22 is replaced by a removing chute in the starting condition, which is not specified in the drawings, or else introducing chute 22 has been displaced in a direction e.g. perpendicular to the paper plane in such a starting position, so that the molten plastic strands emerging from nozzles 3 do not first pass to discharge channel 1 but can fall vertically downward in a suitably disposed collecting vessel.

When introducing chute 22 is then displaced into the operating position thereof, as shown in FIGS. 2 and 3, strands 4 are introduced toward discharge channel 1. Instead of a slanted discharge channel according to FIG. 2, however, the apparatus according to this invention could also have a horizontal or vertical discharge channel.

We claim:

1. An apparatus for cooling and granulating plastic strands, the plastic strands emerging from nozzles (3) in molten form, said apparatus comprising:

a discharge channel (1) having a supply end for receiving the plastic strands, said discharge channel conveying the plastic strands away from the nozzles, said discharge channel having a discharge end for discharging the plastic strands;

a granulator (16) having a housing containing a knife assembly for granulating plastic strands discharged from said discharge chute and received in said granulator; and a draw-off roll assembly (20, 21) interposed between said discharge end of said discharge channel and said granulator, said draw-off roll assembly having a housing containing draw-off rolls for drawing the plastic strands off the discharge end of said discharge chute and supplying them to said granulator;

said granulator and said draw-off roll assembly comprising separate, unitary structures, said granulator being detachably mounted on said draw-off roll assembly so that a granulator may be completely disconnected from said draw-off roll assembly and removed from said draw-off roll assembly, a granulator being thereafter again detachably mounted on said draw-off roll assembly, said housings for said knife assembly and said draw-off roll assembly being formed to be joined together during operation of said apparatus but separable to permit relative displacement between said granulator and said draw-off roll assembly and said complete disconnection and removal of said granulator from said draw-off roll assembly.

2. The apparatus of claim 1 wherein said granulator is detachably mounted on said draw-off roll assembly by means of quick-coupling means connected between said granulator and said draw-off roll assembly.

3. The apparatus of claim 2 wherein said granulator is detachably mounted on said draw-off roll assembly by means of quick-coupling means connected between said housings of said granulator and said draw-off roll assembly.

4. The apparatus of any of claim 2, characterized in that a slanted separating area (17) is provided between the housing (15) of the draw-off roll assembly (20, 21) and the housing (23) of the granulator (16).

5. The apparatus of any of claim 2, characterized in that detachable fastening means are provided between the discharge channel (1) and the housing (15) of the draw-off roll assembly (20, 21).

6. The apparatus of claim 1, characterized in that the draw-off roll assembly has an upper draw-off roll (20) and a lower draw-off roll (21) between which the strands (4) are drawn off, said strands then entering the granulator (16).

7. The apparatus of claim 1 wherein said discharge channel includes means providing a coolant stream for the plastic strands in said discharge channel.

8. The apparatus of claim 1 further including a chute with a cooling water supply interposed between the nozzles and said supply end of said discharge channel.

9. The apparatus of claim 1 wherein said knife assembly of said granulator has a rotatable shearing knife and a counterknife for granulating the strands.

* * * * *